United States Patent [19]
Parkin

[11] 3,943,360
[45] Mar. 9, 1976

[54] RADIANT ENERGY PULSE DETECTOR

[75] Inventor: William J. Parkin, Wayland, Mass.

[73] Assignee: Sanders Associates, Inc., South Nashua, N.H.

[22] Filed: Aug. 12, 1968

[21] Appl. No.: 753,844

Related U.S. Application Data

[63] Continuation of Ser. No. 453,804, May 6, 1965, abandoned.

[52] U.S. Cl............. 250/210; 250/203 R; 250/342; 356/152
[51] Int. Cl.² .................................. H01J 39/12
[58] Field of Search.... 250/203 R, 342, 210, 211 K; 356/138, 152, 153, 172

[56] References Cited
UNITED STATES PATENTS

| | | | |
|---|---|---|---|
| 3,064,253 | 11/1962 | Kirkpatrick | 343/16 M |
| 3,143,650 | 8/1964 | Mizen | 250/203 R |
| 3,226,971 | 1/1966 | Tierney | 250/203 R |
| 3,260,849 | 7/1966 | Polye | 250/203 R |
| 3,293,439 | 12/1966 | Marantette et al. | 250/203 R |

OTHER PUBLICATIONS

Introduction to Monopulse: Rhodes, McGraw-Hill 1959, p. 17.

Primary Examiner—T. H. Tubbesing
Assistant Examiner—S. C. Buczinski
Attorney, Agent, or Firm—Louis Etlinger; Richard I. Seligman

[57] ABSTRACT

Pulse detection apparatus for optical signal pulses including ultra-violet and infra-red frequencies. A photoconductive detector cell has four ohmic output electrode terminals disposed in a rhombic pattern and a centrally disposed input electrode terminal coupled to a source of direct current bias signal. Each pair of oppositely disposed output terminals defines an axis orthogonal to that defined by the other pair. Each pair of output terminals is coupled to a signal translation device such as a transformer with a center tapped primary or a differential amplifier. A pair of output signals are produced indicative of the degree of unbalance of the cell due to an optical signal impinged thereon.

4 Claims, 4 Drawing Figures

INVENTOR
WILLIAM J. PARKIN
BY David A. Rich
ATTORNEY

RADIANT ENERGY PULSE DETECTOR

This is a continuation of application Ser. No. 453,804, filed May 6, 1965, now abandoned.

The present invention relates generally to radiation sensing apparatus and devices. More particularly, the invention relates to optical and near optical sensing apparatus and devices. More especially, the invention relates to apparatus and devices for detecting, displaying and tracking infra red signals.

This application presents an improvement relating to copending applications entitled Radiant Energy Detector, Ser. No. 253,503, filed Jan. 23, 1963; Tracking System, Ser. No. 253,504 filed Jan. 23, 1963, now U.S. Pat. No. 3,657,548; Tracking circuit, Ser. No. 272,181, filed Apr. 5, 1963; Sensing and Tracking Apparatus, Ser. No. 316,203, filed Oct. 10, 1963; Radiant Energy Detection Apparatus, Ser. No. 399,111, filed Sept. 24, 1964; and Multiple Element Sensing Apparatus, Ser. No. 409,355, filed Nov. 4, 1964, now U.S. Pat. No. 3,700,905.

The expression "radiation responsive, variable impedance" as used herein, includes but is not limited to impedance changes due to electromagnetic radiation in its various forms impingent for example upon a detector element. Such changes in impedance may be due to the well known photoelectric effect or to any energy absorbtion in an atomic or quantum mechanical sense. Impedance changes may be thermoelectric in character due to variations in temperature of the detector element derived from impingent radiation.

In the above noted copending applications sensing apparatus, devices and systems are disclosed which produce an output signal in accordance with the position of a radiation source. Such systems however have the disadavantage of becoming exceedingly complex particularly in the biasing circuits when it is desired to detect signals characterized by relatively short bursts of radiant energy such as, for example, a micro-second or less. The present invention relates to an improvement directed to a simplified system which is adapted readily to detect and track short burst s signals as well as signals which may be modulated at relatively high rates.

It is therefore an object of the invention to provide an improved radiant energy pulse sensing apparatus for producing an indication of the presence and location of a remote source of radiation presenting relatively short bursts of radiant energy.

A further object of the invention is to provide an improved sensing apparatus of the character described for producing indications of the presence aned location of a remote source of radiation which simultaneously producing indications of intensity variations of the source without mechanically moving parts.

Another object of the invention is to provide an improved sensing apparatus of the character described which is relatively simple in structure and reliable in operation.

In accordance with the invention there is provided a radiant energy pulse sensing apparatus. The apparatus includes a radiation responsive, variable impedance detector means. The detector means include a first impedance region variable with respect to a second impedance region. Biasing means are coupled to the detector means for providing an axis-defining signal through each of the impedance regions. Load means are provided having a first load impedance element coupled in series with the first impedance region and the bias signal. A second load impedance element is coupled in series with the second impedance region and the bias signal. The load means is coupled in parallel with the detector means. Output position means are coupled to the element for providing an output position signal derived from the change of the bias signal current proportional to the differential impedance between the regions in response to a radiant energy pulse impingent upon one of the regions. The output position signal is indicative of the position of a source of radiant energy signal pulses. Output intensity means are coupled to the detector means for providing an output intensity signal derived from the change of the bias signal current proportional to the diferential impedance between the detector impedance and the load impedance in response to the radiant energy signal pulses.

Other and further objects of the invention will be apparent from the following description of the invention taken in connection with the accompanying drawings and its scope will be pointed out in the appended claims.

IN THE DRAWINGS

Figure 1:
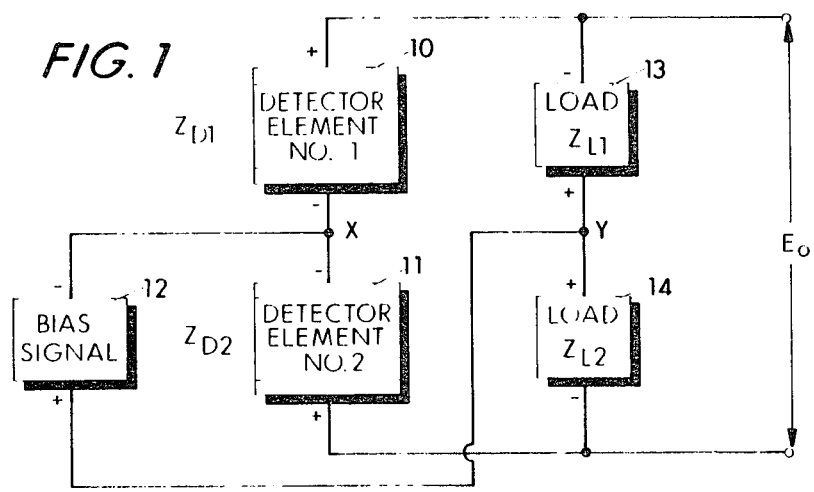
FIG. 1 is a schematic diagram illustrating the principles of operation of the invention.

Referring now to the drawings and with particular reference to FIG. 1 there is here illustrated a schematic circuit diagram illustrating the principles of operation. In the rotating field detector system as illustrated in some of the copending applications, a pair of orthogonally phased bias signals are applied along orthogonal reference axes of a detector element. This produces the effect of a rotating electric field in the element. As discussed in the copending applications radiation impingent on an area produces a differential impedance which in turn produces a composite signal resolvable into vertical and horizontal alternating current components.

Here as shown in FIG. 1 a bias signal 12 is introduced to the junction X between a pair of variable impedance detector elements 10 and 11 which are connected together. The element 10 is connected to a load 13 and then through the junction Y to a load 14. The element 11 is connected to the other end of the load 14. The voltage across the loads 13 and 14 is indicated as $E_o$. The bias signal 12 is connected to the junction Y between the loads 13 and 14. Thus the loads 13 and 14 are connected in parallel with the elements 10 and 11. The load 13 is connected in series with the element 10 and the bias signal 12. The load 14 is connected in series with the element 11 and the bias signal 12.

The system in theory operates perfectly well with an alternating current bias signal connected in this manner. It is preferable however to use a direct current bias signal source. Assuming then that the bias signal 12 is a direct current and the polarities are as indicated in FIG. 1, the voltages across the loads 13 and 14 are equal and opposite in polarity. The resultant output voltage $E_o$ is zero.

Consider the effect of the impingment of a burst of radiant energy such as infra-red energy on the element 10. The impedance of the element 10 decreases; hence, the voltage across the load 13 increases with a greater voltage negative in sign appearing at the upper terminal of the output voltage $E_o$. Conversely if energy is impingent upon element 11 its impedance is reduced and a greater voltage appears across the load 14 with the greater voltage being negative at the lower terminal of the output voltage $E_o$. Thus with the system as shown in FIG. 1 it is possible to produce an output direct current signal the amplitude of which is a function of the intensity of the impingent energy and the polarity of which represents the vertical direction of the signal with respect to an arbitrary boresight axis.

By appropriately shaping the detector elements the position of the impingent energy with respect to the contacts or terminals produces an output varying in amplitude. Since the amplitude also varies with intensity, it is desirable to divide out the intensity from the signal for the purpose of producing an output signal which varies only with the relative angular position of the impingent radiation.

Although not shown in FIG. 1, it is possible to obtain an output intensity signal by adding the voltages across the loads 13 and 14. This principle will be discussed in greater detail with regard to FIGS. 3 and 4.

DESCRIPTION AND EXPLANATION OF THE CIRCUIT IN FIG. 2

Figure 2:
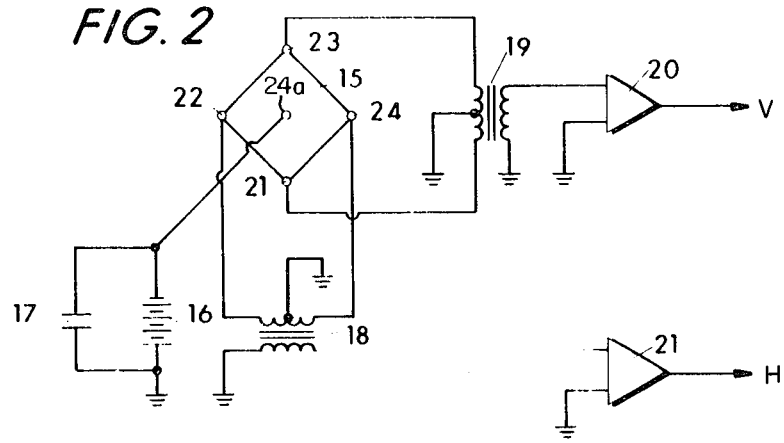
FIG. 2 is a schematic circuit diagram of an embodiment of the invention.

Referring now to FIG. 2 there is here illustrated an embodiment of the invention utilizing transformer output. Here a direct current bias signal is supplied by a battery 16 which is bypassed by a capacitor 17. The direct current bias signal is coupled directly to the central electrode 24a of the detector element 15 having four output terminals 21–25 arranged in a rhombic pattern. The terminals 22, 24 define a horizontal axis and the terminals 21, 23 define a vertical axis. A transformer 19 has its primary winding connected in parallel with the element, 15 through the terminals 21 and 29. The center tap of the primary winding of the transformer 19 is grounded. The secondary of the transformer 19 is coupled to an amplifier 20 to provide an output vertical position signal. A transformer 18 has its primary winding connected in parallel with the element 15 through the terminals 22 and 24. Again the canter tap of the primary winding of the transformer 18 is grounded and the secondary is coupled to an amplifier 21 to produce a horizontal output position signal.

Here it is to be noted that the cell is so shaped as to vary the electric potentials along the horizontal and vertical axis. When no signal is present a direct current bias signal passes through the central terminal to the terminal through the element and the terminal 23 to the primary of the transformer 19 to ground and returns to the battery 16. Similarly bias currents are coupled through the element 15 to the terminal 21 to the primary 19 to ground; through the terminal 22 to the primary of the transformer 18 to ground; and through the terminal 24 through the primary of the transformer 18 to ground.

An example of a cell useful in the present invention is described and illustrated in the above-referenced co-pending U.S. patent application Ser. No. 253,504.

When no signal is present that is when no energy is impingent on the cell, the transformer primary voltages are equal and opposite and steady state. Thus no signal is coupled through the transformers to the amplifiers 20 and 21. It will be apparent that the impedance of the cell 15 is distributed amongst impedance regions which vary relative to each other in response to radiant energy impingent upon one of the regions. Thus for example if energy is impingent on the cell between the central terminal 24a and the vertical terminal 23, the impedance of that region is decreased relative to the region between the central terminal 24a and the vertical terminal 21. For a short burst a momentary change in current is coupled to the upper half of the primary of the transformer 19 to ground. The current through the lower half of the primary of the transformer 19 does not change; hence, a signal is coupled through the transformer 19 to the amplifier 20 and appears as a vertical position signal. Similarly if a signal is impingent on the area between the central electrode and the terminal 24, the voltage across the corresponding portion of the primary winding of the transformer 18 increases producing a pulse which is coupled through the secondary of the transformer 18 to the amplifier 21 to produce an output horizontal position signal.

DESCRIPTION AND EXPLANATION OF THE CIRCUIT IN FIG. 3

Figure 3:
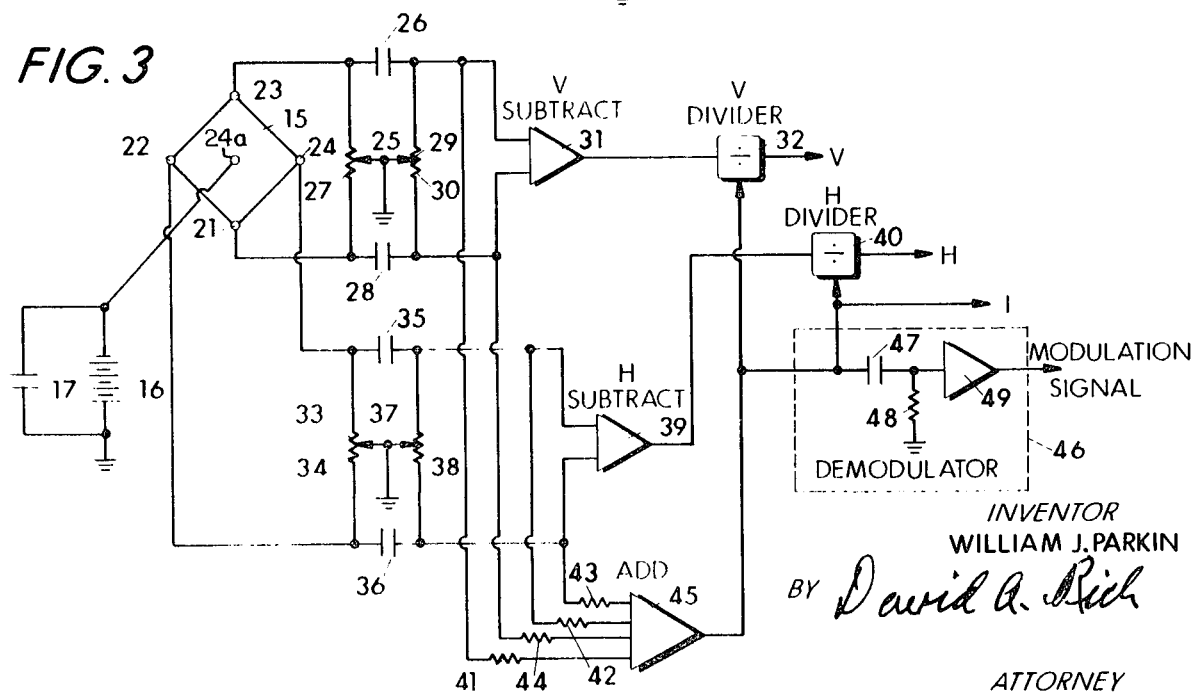
FIG. 3 is a schematic circuit diagram of another embodiment of the invention.

Referring now to FIG. 3, there is here illustrated a modification of the embodiment in FIG. 2 utilizing differentiating circuits involving resistor-capacitor combinations. The output along a given axis is coupled through differentiating circuits to a differential amplifier and then to a divider circuit. The differentiated signals are added to provide an output intensity signal and are also coupled to a divider circuit to produce output position signals having variations independent of intensity. The intensity signal is coupled to a demodulator circuit for demodulating any modulation signal that may be superimposed on the received radiant energy.

The cell 15 and bias circuit battery 16 and coupling capacitor 17 are the same as shown in FIG. 2 and are correspondingly referenced. The vertical axis-defining terminals 21 and 23 are coupled to resistors 25 and 27 as shown to ground. The resistors are coupled to capacitors 26 and 28 to resistors 29 and 30 to ground. The resistors 29 and 30 are coupled to a differential amplifier 31 for producing a vertical position signal. The amplifier 31 is coupled to a vertical divider 32. The capacitors 26 and 28 are also coupled through resistors 41 and 44 to an adder amplifier 45. An output of the amplifier 45 is coupled back to the divider 32.

The horizontal axis-defining terminals 22 and 24 are coupled through resistors 33 and 34 to ground and through capacitors 35 and 36 to resistors 37 and 38 to ground. The capacitors 35 and 36 are coupled to a horizontal differential amplifier 39 and thence to a horizontal divider circuit 40. The capacitors 35 and 36 are also coupled to resistors 42 and 43 to the adder circuit 45 and thence to the horizontal divider 40. The output of the horizontal divider circuit is a horizontal position signal which varies independently of the intensity. A direct output of the adder circuit 45 is the intensity signal. A further output of the adder circuit 45 is coupled to a demodulator circuit 46 through a capacitor 47 and across a resistor 48 to ground. The signal is coupled through a demodulation amplifier 49 to produce an output modulation signal.

With no signal impingent on the detector element the bias current is applied across the resistors 25 and 27 in opposite directions to produce equal and opposite voltages at the capacitors 26 and 28. There is then no output. Similarly in the horizontal channel the voltages across the resistors 33 and 34 are equal and opposite producing no unbalance in the system and the output of the differential amplifier is again zero. Thus with no signal present there is no vertical or horizontal output position signal. In the steady state or quiescent condition there is no unbalance voltage appearing across the resistor 25 relative to the resistor 27 or the resistor 33 relative to the resistor 30; hence, no signal is coupled through the capacitors 26 and 28 or the capacitors 35 and 36. The output of the adder circuit is then zero producing an output indication of intensity which is zero.

Given a momentary burst or modulated signal appearing on the cell, the signal is differentiated and appears across the resistors 29 and 30 and applied to the differential amplifier 31. If for example a signal appears between the central electrode 24a and the vertical electrode 23 the voltage across the resistor 29 is more negative than that across the resistor 30. The output of the differential amplifier 31 is a signal the sign and amplitude of which indicate its vertical position on the cell. However this signal also varies with intensity. The voltages across the resistors 29 and 30 are also coupled through the resistors 41 and 44 to the adder circuit 45 which produces an output intensity signal coupled to the divider 32. The output of the divider 32 is then a true vertical position signal.

In a similar manner the horizontal components are coupled from the capacitor 35 and 36 to the horizontal differential amplifier 35 which subtracts the horizontal components and produces an output signal indicative of the horizontal position which however varies with intensity. The capacitors 35 and 36 are also coupled through the resistors 42 and 43 to the adder circuit 45. An output of the adder circuit 45 is an intensity signal which is applied to the horizontal divider circuit 40. The circuit 40 operates to divide the horizontal position and intensity signal by intensity to produce an output of pure horizontal position which varies independently of the intensity.

Many sources of radiant energy produce a modulated signal which serves to identify the source or provides actual communication as for example a voice channel. The modulation is superimposed on the radiant energy signal in a characteristic manner. Such modulation of the intensity signal is coupled through the capacitor 47 and resistor 48 to the demodulation amplifier 49. The output of the amplifier 49 is the modulation signal which may be, for example, a voice communication channel.

DESCRIPTION AND EXPLANATION OF THE CIRCUIT IN FIG. 4

Figure 4:
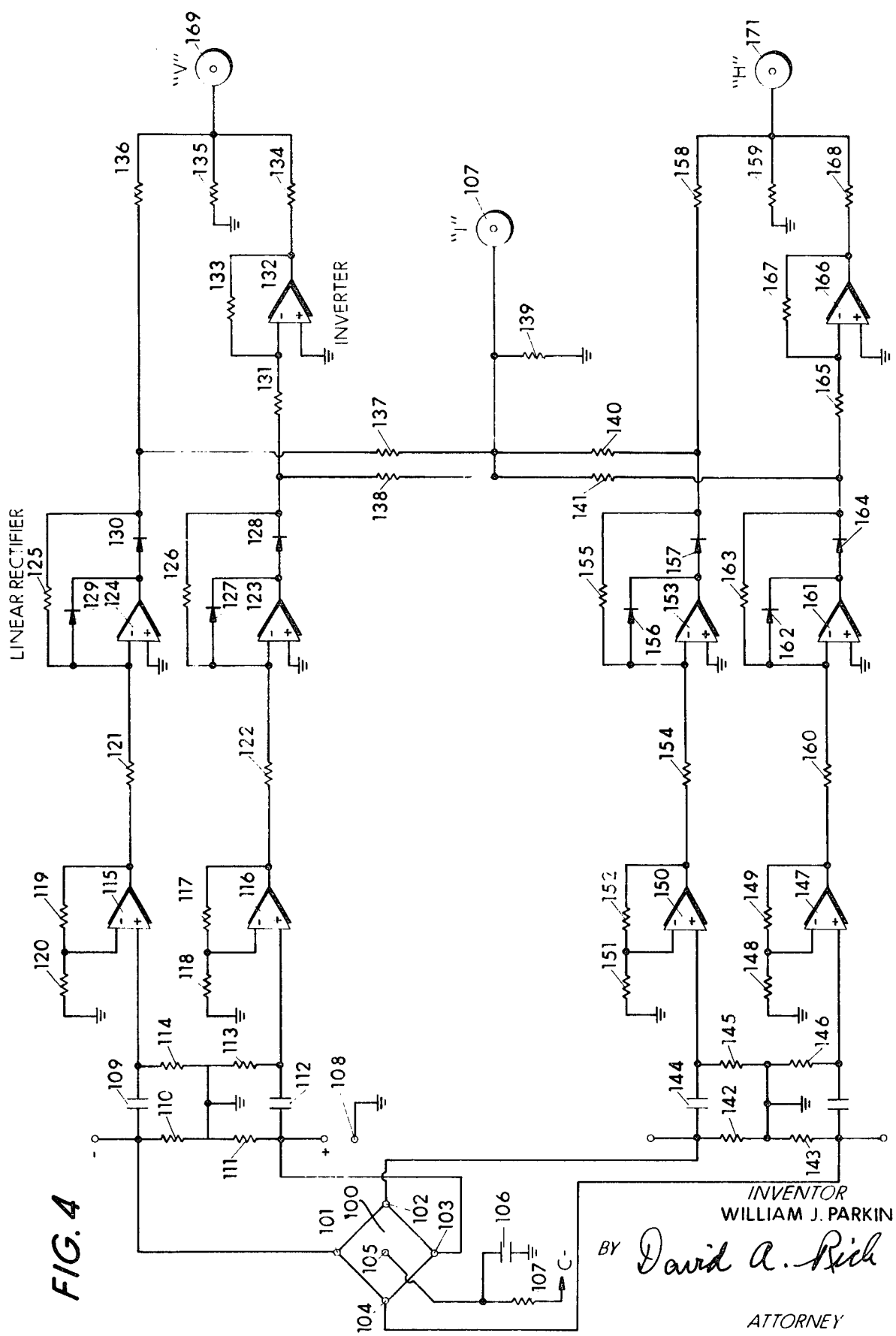
FIG. 4 is a detailed schematic circuit diagram further illustrating the circuit in FIG. 3.

Referring now to FIG. 4 there is here illustrated a modification of the circuit shown in FIG. 3. For greater clarity, the demodulation and divider circuits are not shown. Here a number of operational amplifiers are utilized in order to insure the proper gain throughout the system. The operational amplifiers shown in FIG. 4 are preferably model SA3 as manufactured by Nexus Research Laboratories, 480 Neponset Street, Canton, Mass.

Thus again we have a cell 100 with an input central electrode 105 and output electrodes 101–104. The electrode 105 is coupled through a bypass capacitor 106 to ground and through a resistor 107 to a source of negative voltage labeled C−, preferably −15 volts. The electrodes 101 and 103 define a vertical axis and are coupled to the vertical channels associated with operational amplifiers 115, 116, 123, 124, and 132. The electrodes 101 and 103 are coupled to a pair of resistors 110 and 111 to ground and through a pair of capacitors 109 and 112 across resistors 113 and 114 to ground. A grounded terminal 108 is connected to a shield for the element 100. The resistors 113 and 114 are coupled to the positive side of the differential amplifiers 115 and 116. The amplifier 115 is coupled back to its negative terminal through a resistor 119 and a resistor 120.

The ratio of resistances between the resistor 119 and the resistor 120 defines the gain of the amplifier 115. Preferably the resistor 119 is 100,000 ohms and the resistor 120 is 10,000 ohms to provide a gain of 10. If it is so desired the resistor 120 may be 1000 ohms to provide a gain of 100. The amplifier 115 is coupled through a resistor 121 to a linear rectifier operational amplifier 124. The output of the amplifier 124 is coupled through a diode 129 to its negative terminal through a diode 130 and resistor 125 to its negative terminal. The output of the amplifier 124 is also coupled to a resistor 136 and appears across a resistor 135 to ground and at a vertical position signal terminal 169. In the bottom leg of the vertical channel the amplifier 116 is coupled through resistors 117 and 118 to ground and through resistor 117 to its negative terminal. The amplifier 116 is coupled through a resistor 122 to a linear rectifier operational amplifier circuit associated the amplifier 123. The output of the amplifier 123 is coupled through a diode 127 to its negative terminal and through a diode 128 and resistor 126 to its negative terminal. The positive terminals of the amplifiers 123 and 124 are grounded. The output of the amplifier 123 is coupled through a resistor 131 to an operational amplifier 132 which may invert the signal. The positive input of the amplifier 132 is grounded and its output is coupled through a resistor 133 to its negative terminal. The output of the inverter is coupled through a resistor 134 to appear across the resistor 135 to ground at the vertical terminal 169.

The horizontal axis-defining terminals 102 and 104 are coupled to resistors 142 and 143 to ground. The resistors are coupled through capacitors 144 and 144a to resistors 145 and 146 to ground. The horizontal channel includes the circuitry associated with the operational amplifiers 147, 150, 153, 161, and 166. Horizontal channel circuitry is identical to that for the vertical channel. Thus the output of the amplifier 150 is coupled through a resistor 152 to its negative terminal and through resistor 151 to ground. The output of the amplifier 150 is coupled to the negative terminal of the amplifier 153. The output of the amplifier 153 is coupled through a diode 156 to its negative terminal and through a diode 157 and a resistor 155 to its negative terminal. The positive terminal of the amplifier 153 is grounded. The output of the amplifier 153 is coupled through a resistor 158 to appear across a resistor 159 to ground and to a horizontal position signal output terminal 171. The lower leg of the horizontal channel is coupled from the capacitor 144a to the positive terminal of the amplifier 147. The output of the amplifier 147 is coupled through a resistor 149 to its negative terminal through a resistor 141 to ground. The output of the amplifier 147 is coupled through a resistor 160 to the negative terminal of the amplifier 161.

The output of the amplifier 161 is coupled through a diode 162 to its negative terminal through a diode 164 and a resistor 163 to its negative terminal. The positive terminal is grounded. The output of the amplifier 161 is coupled through a resistor 165 to the negative terminal of an inverter amplifier 166. The positive terminal is grounded. The output of the amplifier 166 is coupled through the resistor 167 to its negative terminal. The output of the amplifier 166 is coupled through a resistor 168 to appear across the resistor 159 to ground. The output of the amplifiers 153 and 161 are coupled through resistors 140 and 141 to appear across a resistor 139 to ground and to an output intensity signal terminal 107. The output of the amplifiers 123 and 124 are coupled through resistors 137 and 138 to appear across the resistor 139 to ground and at the intensity signal terminal 107.

When a signal is impingent for example in the impedance region between the terminals 101 and 105 a negative voltage appears across the resistor 110 which is coupled through the capacitor 111 to the positive terminal of the amplfier 115. The signal is amplified to appear as a negative signal at the negative terminal of the amplifier 124. The circuit associated with the amplifier 124 is designed to overcome the liitations of square law detection. The circuits as shown operates as a linear rectifier down to very small voltages. This action is due to the characteristic gain and feedback associated with the amplifier 124. Signal output is then applied through the resistor 136 across the resistor 135 to ground, appearing at the terminal as a relatively large positive voltage. The voltage across the resistor 111 is positive as shown and coupled through the capacitor 112 to the positive terminal of the amplifier 116. The signal is then amplified and appears as a negative going signal applied to the negative terminal of the amplifier 123. At that point it is rectified and the output positive going signal is applied to the negative terminal of the inverted amplifier 132 to produce a negative going signal in the output which appears across the resistor 135. The resultant positive signal appears at the terminal 169 and may be used for example to drive a direct current servo motor to orient the cell along the vertical or elevation angle to coincide with the tracking angle of a remote source of radiant energy. Given an unbalance along the horizontal axis, the horizontal channel operates in a similar manner. The signal outputs of the amplifiers 123 and 124 are coupled to the resistors 137 and 138 to appear across the resistor 139. The outputs of the amplifiers 153 and 161 are coupled through the resistors 140 and 141 to appear across the resistor 139 and provide an output intensity signal.

It will be apparent from the foregoing description of the invention that the present invention presents an important step forward in the detection, displaying and tracking of information relating to a remote source of modulated or short bursts of radiant energy.

While there has hereinbefore been described what at present are considered to be the preferred embodiments of the invention, it will be apparent to those of ordinary skill in the art that many modifications and changes may be made thereto without departing from the true spirit and scope of the invention.

It will be considered, therefore, that all those changes and modifications which fall fairly within the scope of the invention shall be a part of the invention.

What is claimed is:

1. Apparatus for detecting the position of radiant energy emitted in pulses by a remote target comprising
   a single radiation responsive variable impedance detector element having a first impedance region which is variable with respect to a second impedance region,
   direct current biasing means coupled to said detector element for providing an axis defining bias signal current through each of said impedance regions,
   a load coupled in parallel with said detector element, having a first load impedance element coupled in series with said first impedance region and said biasing means, and having a second load impedance element coupled in series with said second impedance region and said biasing means,
   said biasing means providing a first bias signal current from said biasing means through said first impedance region and said first load impedance element back to said biasing means, and a second bias signal current from said biasing means through said second impedance region and said second load impedance element opposing said first bias signal current back to said biasing means,
   differential output means coupled to said detector element for providing a position output signal derived from a change in said bias signal currents due to a change in impedance of one of said first and second impedance regions upon the impingement thereon of at least one pulse of radiant energy,
   summing means coupled in parallel to said detector element for providing a signal representative of the intensity of said radiant energy pulse, and
   means coupled to said differential output means and said summing means for dividing said position output signal by said intensity signal.

2. Apparatus for detecting of radiant energy emitted in pulses by a remote target comprising
   a single radiation responsive variable impedance detector element having first and second impedance regions which are variable with respect to third and fourth impedance regions respectively,
   direct current biasing means coupled to said detector element for providing a pair of orthogonal axes-defining bias signal currents through each of said impedance regions,
   a first load coupled in parallel with said detector element having a first load impedance element coupled in series with said first impedance region and said biasing means, and having a second load impedance element coupled in series with said second impedance region and said biasing means,
   a second load coupled in parallel with said detector element having a third load impedance element coupled in series with said third impedance region and said biasing means, and having a fourth load impedance element coupled in series with said fourth impedance region and said biasing means,
   said biasing means providing a first bias signal current from said biasing means through said first impedance region and said first load impedance element back to said biasing means, a second bias signal current from said biasing means through said second impedance region and said second load impedance element opposing said first bias signal current back to said biasing means, a third bias signal current from said biasing means through said third impedance region and said third load impedance element back to said biasing means, and a fourth biasing signal current from said biasing means through said fourth impedance region and said fourth load impedance element opposing said third bias signal current back to said biasing means, first differential output means coupled to said detector element for providing a horizontal position output signal derived from a change in said first and second bias signal currents due to a change in impedance of one of said first and second impedance regions upon the impingement thereon of at least one pulse of radiant energy, and second differential output means coupled to said detector element for providing a vertical position output signal derived from a change in said third and fourth bias signal currents due to a change in impedance of one of said third and fourth impedance regions upon the impingement thereon of at least one pulse of radiant energy means coupled to said first and second output means for summing the output signals thereof to thereby provide a signal representative of the intensity of said radiant energy pulse, and first and second means coupled to said first and second output means respectively and to said summing means for dividing each said horizontal and vertical position output signals by said intensity signal.

3. Apparatus as recited in claim 2 wherein
said detector comprises a photoconductive detector having
four output ohmic terminals disposed in a rhombic pattern thereon, and
an input ohmic terminal centrally disposed with respect to said pattern.

4. Apparatus as recited in claim 2 further including demodulator means coupled to said summing means.

* * * * *